US 10,268,912 B2

(12) United States Patent
Adamek et al.

(10) Patent No.: US 10,268,912 B2
(45) Date of Patent: Apr. 23, 2019

(54) OFFLINE, HYBRID AND HYBRID WITH OFFLINE IMAGE RECOGNITION

(71) Applicant: CATCHOOM TECHNOLOGIES, S.L., Barcelona (ES)

(72) Inventors: Tomasz Adamek, Barcelona (ES); David Marimon, Barcelona (ES); Luis Martinell Andreu, Barcelona (ES)

(73) Assignee: CATCHOOM TECHNOLOGIES, S.L., Barcelona (ES)

( * ) Notice: Subject to any disclaimer, the term of this patent is extended or adjusted under 35 U.S.C. 154(b) by 56 days.

(21) Appl. No.: 15/313,066

(22) PCT Filed: Mar. 16, 2015

(86) PCT No.: PCT/EP2015/055430
§ 371 (c)(1),
(2) Date: Nov. 21, 2016

(87) PCT Pub. No.: WO2015/176840
PCT Pub. Date: Nov. 26, 2015

(65) Prior Publication Data
US 2017/0185857 A1 Jun. 29, 2017

(30) Foreign Application Priority Data

May 23, 2014 (EP) .................................. 14169741

(51) Int. Cl.
G06K 9/00 (2006.01)
G06K 9/62 (2006.01)
(Continued)

(52) U.S. Cl.
CPC ....... *G06K 9/00973* (2013.01); *G06F 16/532* (2019.01); *G06K 9/4676* (2013.01);
(Continued)

(58) Field of Classification Search
CPC ...... G06K 9/4676; G06K 9/6205; G06K 9/42; G06K 9/00973; G06K 2209/19;
(Continued)

(56) References Cited

U.S. PATENT DOCUMENTS 8,090,222 B1 * 1/2012 Baluja ............... G06F 17/30247
382/305
2009/0324026 A1 * 12/2009 Kletter ............... G06K 9/00442
382/124
(Continued)

FOREIGN PATENT DOCUMENTS

WO WO 2011161084 A2 * 12/2011 ............... G06K 9/42

OTHER PUBLICATIONS

Large-scale visual search based on voting in reduced pose space with application to mobile search and video collections Tomasz Adamek; David Marimon 2011 IEEE International Conference on Multimedia and Expo Year: 2011, pp. 1-4.*
(Continued)

Primary Examiner — Kim Y Vu
Assistant Examiner — Michael J Vanchy, Jr.
(74) Attorney, Agent, or Firm — Squire Patton Boggs (US) LLP

(57) ABSTRACT

Methods and systems of identification of objects in query images are disclosed. Keypoints in the query images are identified corresponding to objects to be identified. Visual words are identified in a dictionary of visual words for the identified keypoints. A set of hits is identified corresponding to reference images comprising the identified keypoints. Reference images corresponding to the identified set of hits are ranked using clustering of matches in a limited pose space. The limited pose space comprises a one-dimensional table corresponding to the rotation between the object to be identified with respect to the reference image. A first subset
(Continued)

of M reference images that obtained a rank above a predetermined threshold is then selected. Offline, hybrid and combined offline and hybrid systems for performing the proposed methods are disclosed.

13 Claims, 6 Drawing Sheets

(51) Int. Cl.
  *G06F 17/30* (2006.01)
  *G06K 9/46* (2006.01)
  *G06F 16/532* (2019.01)
(52) U.S. Cl.
  CPC ......... *G06K 9/6205* (2013.01); *G06K 9/6218* (2013.01); *G06K 9/46* (2013.01)
(58) Field of Classification Search
  CPC ...... G06K 9/46; G06K 9/6218; G06K 9/6228; G06F 17/30277; G06T 2207/20016; G06T 2207/20061; G06T 7/0006
  See application file for complete search history.

(56) References Cited

U.S. PATENT DOCUMENTS

| | | | |
|---|---|---|---|
| 2012/0221572 A1* | 8/2012 | Wang | G06F 17/30256 707/737 |
| 2013/0202213 A1 | 8/2013 | Adamek et al. | |

OTHER PUBLICATIONS

International Search Report and Written Opinion for PCT/EP2015/055430 dated Jun. 2, 2015, 17 pages.
Adamek, T., et al: "Large-Scale visual search based on voting in reduced pose space with application to mobile search and video collections", Multimedia and Expo (ICME) Jul. 11, 2011 IEEE International Conference, 4 pages.
Anonymous, "Loop tiling", Wikipedia, the free encyclopedia, Jan. 25, 2015, XP055190153, Retrieved from the Internet: URL:http://en.wikipedia.org/w/index.php ?title=Loop_tiling&oldid=592327567 [retrieved on May 19, 2015], Overview Section, sentence 1, 3 pages.
Anonymous, "Sorted array", Wikipedia, the free encyclopedia, Apr. 25, 2014, XP055190141, Retrieved from the Internet: URL:http://en.wikipedia.org/w/index.php?title=Sorted_array&oldid=605680449 [retrieved on May 19, 2015], Overview Section, sentence 1, 3 pages.
Chen, David M., et al: "Memory-Efficient Image Databases for Mobile Visual Search", IEEE Computer Society, Mar. 2014, pp. 14-23.
Girod, Bernd, et al: "Mobile Visual Search: Architectures, Technologies, and the Emerging MPEG Standard", IEEE Computer Society, Multimedia, IEEE Service Center, New York NY, US , vol. 18, No. 3, Mar. 1, 2011, pp. 86-94, XP011381240, ISSN: 1070-986X, DOI: 10.1109/MMUL.2011.48.
Illingworth, J., et al: "A Survey of Efficient Hough Transform Methods", Proceedings of the Alvey Vision Conference, Jan. 1, 1987, pp. 43.1-43.8, XO055189845, DOI: 10.5244/C.1 .43, p. 320, col. 2, sentence 5 and 10.
Ji, Rongrong, et al: "Towards Low Bit Rate Mobile Visual Search with Multiple-channel Coding", Proceedings of the $19^{th}$ ACM International Conference on Multimedia 2011, pp. 573-582.
Liu, Cailiang, et al: "Robust semantic sketch based specific image retrieval", Multimedia and Expo (ICME), 2010 IEEE International Conference, IEEE, Piscataway, NJ , US, Jul. 19, 2010, pp. 30-35, XP031761403, ISBN: 978-1-4244-7 491-2, p. 32 section Exemplar Reranking.
Lowe, David G., "Distinctive Image Features from Scale-Invariant Keypoints", International Journal of Computer Vision, Kluwer Academic Publishers, BO, vol. 60, No. 2, Nov. 1, 2004, pp. 91-110, XP019216426, ISSN: 1573-1405, DOI: 10.1023/B:VISI.0000029664.99615.94, section 7.3, paragraph 2 and section 7.3 last sentence.
Marimon, David, et al: "DARTs: Efficient scale-space extraction of DAISY keypoints", 2010 IEEE Conference on Computer Vision and Pattern Recognition (CVPR), 8 pages.
Misiti, Michel, et al: "Wavelet Toolbox Computation Visualization Programming User's Guide Version 1 for Use with MATLAB ", Mar. 3, 1997, XP55189971, Retrieved from the Internet: URL:http://feihu.eng.ua.edu/NSF _TUES/w7_1a.pdf [retrieved on May 15, 2015], pp. 8-118.
Philbin, James, et al: Object retrieval with large vocabularies and fast spatial matching, Proc. CVPR, 2007, 8 pages.
Takacs, Gabriel, et al: "Outdoors Augmented Reality on Mobile Phone using Loxel-Based Visual Feature Organization", *MIR'08*, Oct. 30-31, 2008, 8 pages.

* cited by examiner

OFFLINE, HYBRID AND HYBRID WITH OFFLINE IMAGE RECOGNITION

The present disclosure relates to image recognition and more specifically to devices and methods for identifying objects pictured in images.

BACKGROUND ART

Identifying a particular object in a collection of images is a challenging problem because objects' visual appearance may be different due to changes in viewpoint, lighting conditions, or due to partial occlusion. Various solutions performing relatively well with small collections already exist as well as solutions that demand significant processing resources for larger collections.

For example, a method of identification of objects in images has been described in WO2011161084. The method comprises a feature extraction stage, an indexing stage of reference images and a stage of recognition of objects present in the query image. WO2011161084 describes voting in a reduced space as part of the recognition stage of objects. However, the voting process described is performed in rotation and scale space. In other words, accumulators where the votes are aggregated have two dimensions, one corresponding to the rotation of the matched objects and another to the scaling between the matched objects. Such accumulators have a relatively high memory requirements, e.g. using R rotation bins, S scaling bins, and floating point representations of votes accumulated in each bin (32 bits) each accumulator requires at least R×S×32 bits. This particularly limits image recognition systems when implemented in mobile platforms, e.g. mobile devices such as mobile phones.

FIG. 1 shows an inverted file structure as disclosed in WO2011161084 for the indexing stage. The indexing stage involves extraction of local features for reference images and their organisation into a structure allowing their fast matching with features extracted from the query images. This process consists of (i) key-point extraction and (ii) post-processing, (iii) assignment of key-points to visual words, (iv) estimation of voting weights, and (v) addition of key-points to the inverted file structure as the so-called hits. Adding a new reference object to the database involves adding hits representing key-points to the inverted file structure. In the inverted file structure there is one list (hit list) for every visual word that stores all occurrences (hits) of the word in reference images. An implementation of the initial voting approach from WO2011161084 accesses memory addresses randomly. The random order is acceptable when all accessed memory can be fetched from CPU core cache (e.g. L1 in case of most Intel's CPUs), which is much faster than accessing the main system memory. However, when the collections of reference images are large, and the accessed memory is much larger than what fits in the CPU core cache, the cache is constantly flushed. This not only makes the CPU memory caching useless for the voting process, but also affects all other running recognition processes that benefit from CPU memory caching. As a result, for large collections the speed of a naive implementation of the voting from WO2011161084 is several times worse than what could be expected by simply linearly extrapolating the speed obtained for small number of reference images.

It is desirable to provide devices and methods for image recognition that at least partially solve the aforementioned problems.

BRIEF DESCRIPTION OF THE DRAWINGS

Particular examples of the present invention will be described in the following by way of non-limiting examples, with reference to the appended drawings, in which.

DETAILED DESCRIPTION OF EXAMPLES

A first objective is a method and system that allows the performance of offline image recognition of objects pictured in images by a mobile device.

Another objective is a method and system that allows extraction of visual features from an image and their assignment to a pre-computed dictionary of visual words on the mobile device, and transmission of the identifiers of the assigned visual words and their pose (location, orientation and scale) to a server to search for other images of objects in a database that have visual features that can be assigned to those same visual words.

Yet another objective is a method and system that allows the performance of offline image recognition of objects pictured in images of a reduced database by a mobile device, and then searching on a server in case the recognition did not produce satisfactory results (whether it is because of no matches, low score of matches, or whatever service logic that decides to continue the search in the server).

In a first aspect, a method of identification of objects in a query image is disclosed. The method comprises: identifying at least one keypoint in the query image corresponding to an object to be identified; identifying a visual word in a dictionary of visual words for said at least one keypoint; identifying a set of hits corresponding to reference images comprising said at least one keypoint; ranking the reference images corresponding to the identified set of hits using clustering of matches in a limited pose space, said limited pose space comprising a one-dimensional table corresponding to the rotation between the object to be identified with respect to the reference image; selecting a first subset of M reference images that obtained a rank above a predetermined threshold.

Figure 2A:
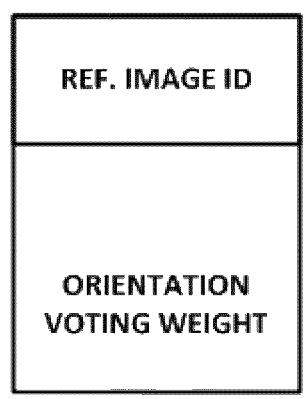
FIGS. 2a and 2b show example hit structures.

By limiting the pose space to a one-dimensional table corresponding to the rotation only (or orientation) between the object to be identified with respect to the reference image, it is possible to use vote accumulators that are smaller compared to the vote accumulators used in WO2011161084. Storing votes requires one-dimensional arrays with only R bins thus reducing the memory requirement to only R×32 bits. This results in larger number of vote accumulators fitting into processor cache and therefore faster voting. FIG. 2a shows a hit structure according to an example. It comprises a ref. image identifier, orientation (or rotation) and voting weight.

In some examples the method further comprises re-ranking the M selected reference images based on spatial verification information with the normalized location of the identified object in each reference image of the first subset.

Using smaller accumulators reduces the discriminatory power (i.e. more false alarms) of the voting approach. Therefore, after the initial results are obtained by this modified voting, it is proposed that the most promising reference image candidates are then further re-ranked based on spatial constraints between matches (pairs of query image key-points and hits).

The re-ranking based on the spatial consistency requires specific extension of the method disclosed in WO2011161084 that makes it computationally efficient. Since spatial re-ranking requires more complete information about key-point poses, row and column position of the original key-point is stored in every hit. Also, dimensions of every reference image are stored in memory for fast access.

Figure 2B:
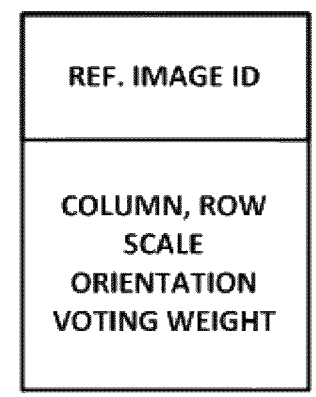

FIG. 2b shows a hit structure according to another example. It comprises a ref. image identifier, row and column information, scale, orientation and voting weight.

The re-ranking starts after the selection of relevant objects according to the initial voting. A number of the most promising reference images is selected. Also, it should be noted that for each selected reference image the most voted rotation obtained during voting is still available.

The spatial verification re-ranking works in two steps:
(i) Creation of matching candidates (links between local features (key-points)) using the information from the initial voting. This process is very similar to the initial voting, except that instead of casting votes into accumulators the more detailed information in form of matches between query key points and hits is obtained for every reference image that was selected as a promising match. Since it is proposed to store more complete pose information for each hit than described in WO2011161084 this creation of matching candidates can be obtained efficiently by traversing again lists of hits for visual words corresponding to query key-points. Specifically, for each key-point visual word from query image the list of hits with the same visual word is traversed, the rotation information obtained from query key-point and hit orientations is used and compared with the most voted orientation obtained from the initial voting, and if the match rotation is sufficiently close to the most voted rotation in the initial stage the match it is stored for further verification. Query key-point and hits pairs (matches) that have rotation very different from the most voted one are omitted from further processing. For each accepted query key point and hit pair (match) key-point and hit poses are stored, and the corresponding voting weight (i.e. strengths corresponding to every key-point).
(ii) For each matching reference image candidate, the set of matches between query key points and ref. image key points (hits) obtained from step (i) is taken and spatial consistency verification is performed similar to the one proposed in "J. Philbin, O. Chum, M. Isard, J. Sivic, and A. Zisserman, *Object retrieval with large vocabularies and fast spatial matching*, Proc. CVPR, 2007 (Philbin et al.). In order to limit computational cost of the verification only a pre-defined number of matches with the highest weight is used. Also, since the matches are already consistent in terms of rotation (in other approaches the matches taken for spatial verification have not passed any spatial verification) the number of inliers compared to the number of outliers is higher than in other methods. This allows using configuration and parameters of the spatial consistency verification approach that have lower computational costs and give better results than in other recognition methods that do not guarantee such low number of outliers being passed to this verification stage. In other words, it has been shown that using the initial voting in the pose space reduced to rotation gives significant benefits in terms of reducing the computational cost of the later spatial verification stages that follow this initial voting.

The above re-ranking of reference images is somehow similar to the one described in (Philbin et al.) but is combined with the method from WO2011161084 in a unique and novel way. It should be understood that using this re-ranking step enables correcting false positive results caused by the simplification of the initial voting to rotation only described above. At the same time, the voting in the rotation space provides benefits that allow faster full spatial verification re-ranking than in other recognition approaches.

When the reference images are derived from a pool of reference images of size N, the method may further comprise dynamically adjusting the size M of the first subset based on the number N of reference images. In one implementation, M may be the maximum between A and $f(A) \times N$, where $A < N$ and $f(A)$ is a function of A.

The number of the most promising matches from the initial voting that is further passed for the spatial consistency verification stage may be adjusted based on a threshold controlling a minimum score required for acceptable results and may be limited by a number (M) dynamically adjusted according to the number of reference images (N). In an example implementation M was set equal to MAX(450, $0.045 \times N$).

Also, experiments have revealed that the memory requirements of the hits described in WO2011161084 greatly affect the speed of the initial voting. Therefore their memory requirements were optimised by representing their parameters with integer with specific number of bits that still produce satisfactory results. In addition to the reduced memory requirements this change allows implementing the initial voting using mainly integer calculations rather than calculations with floating point precision. Those calculations are significantly faster on mobile platforms.

In some examples the method further comprises re-ranking the M reference images based on the areas of the objects in the M reference images that have been matched. This is an addition to the method described in WO2011161084 that improves recognition results (i.e. the number of successfully matched relevant images) without any significant increase of computational cost. Also, it enables returning additional result parameters together with the score allowing additional post-processing of the results and their filtering.

During indexing of a reference image the image is divided into a spatial grid (e.g. 8×8 bins). The number of bins that have one or more key points is recorded as Reference Spatial Coverage (RSC). During matching, the same grid is used to count the number of bins that have one or more key points matched with the query image (Matched Reference Spatial Coverage or MRSC). The ratio RSC/MRSC is then incorporated into the final score indicating the relevance of the reference image to the query image. In other words, reference images are ranked based on scores combining the similarity measure from WO2011161084 and the RSC/MRSC ratio. This extension ensures that objects from reference images that have larger areas being matched are ranked higher in the returned result lists. The counting of key points and matches falling into spatial bins has very low computational cost and therefore is very well suited for mobile devices.

Additionally, an equivalent ratio for query images may be also computed (QSC/MQSC). Both measures can be used to effectively compute and return percentages of the textured query and reference image areas that got matched. Those additional result parameters allow to further differentiating the returned results in terms of "zoomed in" or "zoomed out" relation of the object in the query image to the object from the reference image. In other words:

- a large percentage of textured reference image area that got matched may indicate that the entire object is visible in the query image ("zoom out"). The opposite may indicate that query image depicts a "zoom in" into the recognized object or a partial match.
- a large percentage of the textured query image area that got matched may indicate that the matched object covers most of the query scene. The opposite may indicate that the recognised object is small in the query scene or there is only partial match.

In some examples the hits are ordered in sets so that all vote accumulators needed to store votes casted from said hits are configured to fit into one or more cache memory blocks.

To further leverage the cache mechanisms on mobile processors (and also server and desktop processors) further optimisations of WO2011161084 are proposed aiming at maintaining locality of memory accesses during the voting process.

The proposed voting way ensures that memory accesses belong to blocks that fit entirely into CPU core cache. This is a specific voting algorithm that changes the order in which the votes are casted as compared to the order suggested in WO2011161084. The new voting order produces the same result as the original approach, but several times faster.

In some examples each hit comprises a reference image identifier and the hits are ordered in a way that the reference image identifiers increase monotonically inside each visual word hit set. This has to be ensured whenever a new reference image features (hits) are added or removed from the collection. More specifically, the idea is to always maintain the order of hits so for any hit from a given visual word hit list its reference image identifier is greater than or equal to the reference image identifier of the hit before it.

Figure 1:
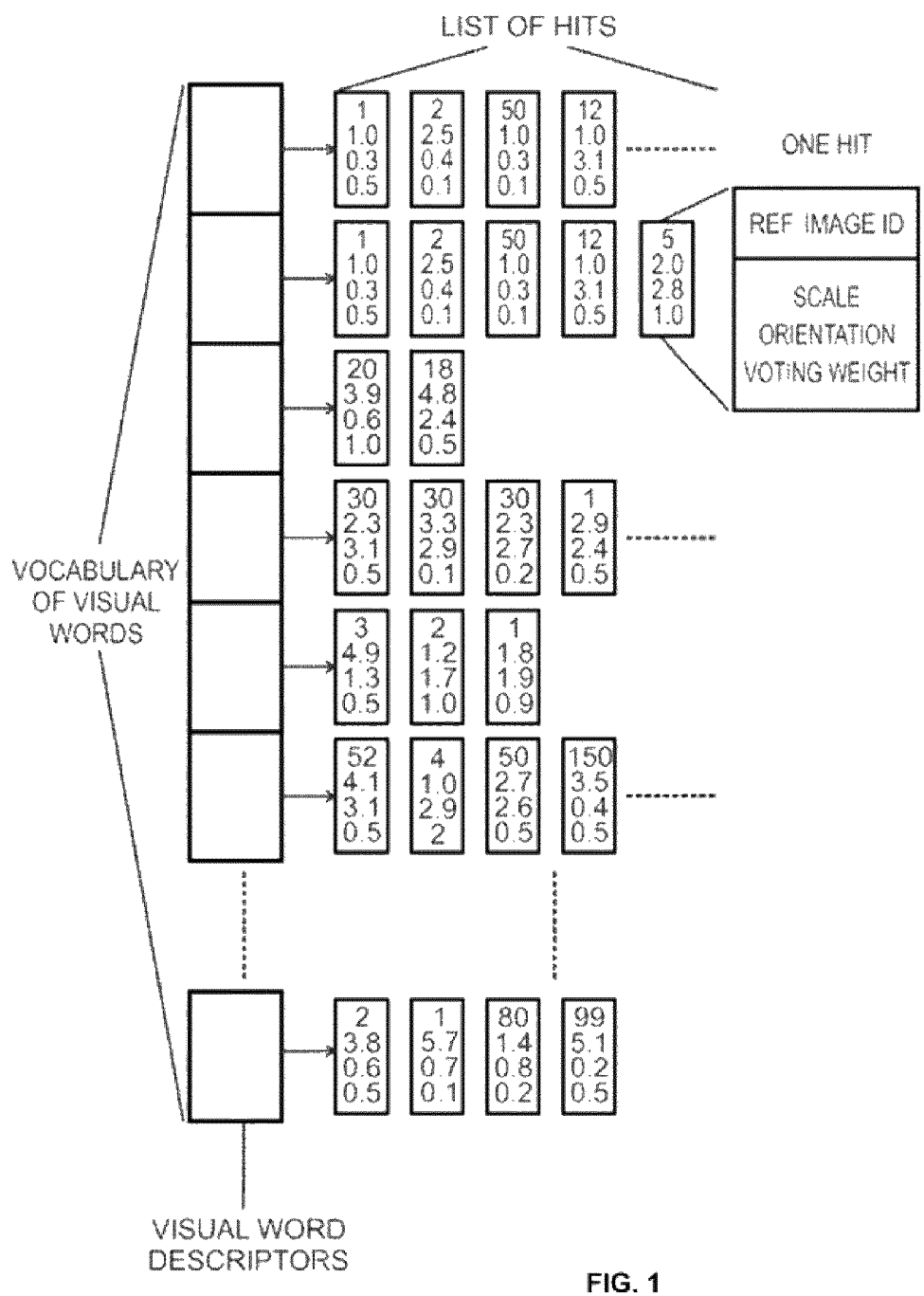
FIG. 1 illustrates a prior art inverted file structure.
Figure 3:
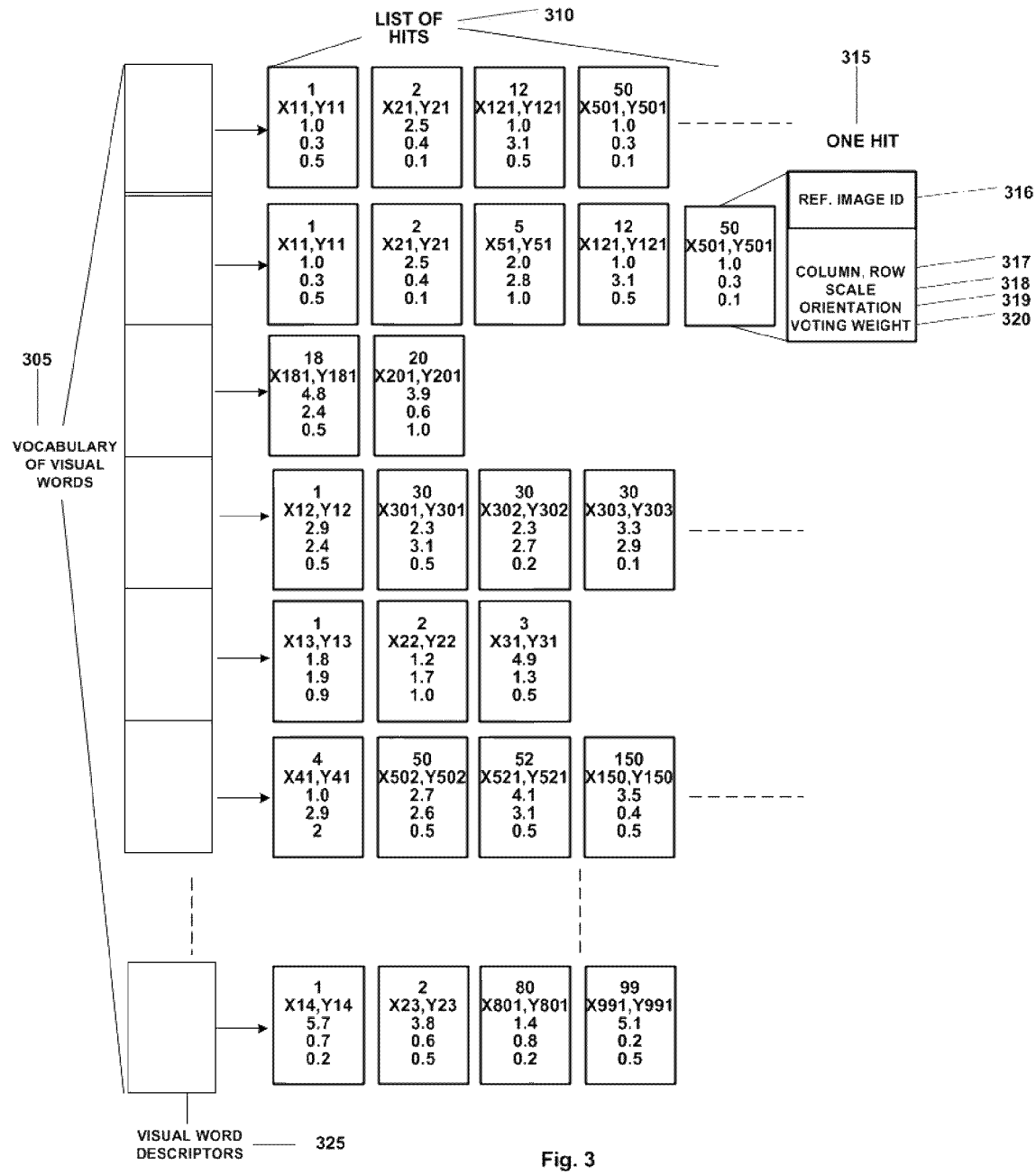
FIG. 3 illustrates an inverted file structure according to an example.

FIG. 3 shows an inverted file structure according to an example. The visual word descriptors 325 of the vocabulary of visual words 305 comprise the same set of hits 320 as the ones in FIG. 1. However, the set of hits in the visual word descriptors 325 are ordered in a way that the reference image identifiers 316 increase monotonically inside each visual word hit set. Although each hit is depicted comprising a ref. image id 316, column-row position of the original key-point 317, scale, 318, orientation 319 and voting weight 320, it should be noted that other combinations are also possible. For example, in some implementations, each hit may comprise only ref. image id 316, orientation 319 and voting weight 320. In other implementations each hit may also comprise column/row information 317 and/or scale 318.

When adding new reference images, it is trivial to ensure ordering the set of hits in the visual word descriptors 325, in a way that the reference image identifiers 316 increase monotonically inside each visual word hit set. For example, the new reference image can always get assigned an identifier that is greater than any of the existing image identifiers (e.g. by incrementing the counter storing the last image identifier) and its hits can be added at the end of the visual word hit lists. But the new voting approach requires that this increasing order is also maintained after removal of reference images from the collection to be searched. This is a relatively minor drawback when compared to the resulting speedup during the search. In other words, in some implementations this may increase the complexity of the removal process when compared to other implementations that do not require any specific order of the image identifiers in hit lists. For example, in cases where hit lists are implemented with arrays or vectors (most efficient data structures for modern CPUs) one practical implementation of ensuring the correct order of hits when removing an image with identifier equal k would be to: (1) eliminate all its hits from each array, (2) and then re-use k as the identifier value for hits of the reference image with the highest existing identifier value (effectively decreasing by one the highest used identifier) and, if needed, (3) copy such modified hits into the correct position in the array, and (4) shift positions of the hits with identifiers greater than k. The above implementation not only ensures the identifiers to increase monotonically, but also results in using all integer values from range [0, N−1] (where N is the total number of reference images), which is practical for efficient implementations in many commonly used programming languages. An alternative removal implementation could ensure the correct order by temporarily marking the hits to be removed as inactive, and then remove them during a periodical process cleaning all inactive hits.

As in WO2011161084, before the voting starts all voting accumulators are allocated in RAM (random-access memory) and initialised with zeros. There is one vote accumulator allocated for each reference image from the collection. It should be noted that currently CPU cache mechanisms cannot be controlled explicitly by programmatic means. Therefore the proposed approach requires that the CPU performs adequate memory caching in order to speed up accesses to the accumulators allocated in RAM. In other words, the voting approach has been re-designed in a way that respects the limits of the commonly used caching mechanisms.

The voting may be performed iteratively over subsets of reference images (chunks of the entire database). Each subset size may be limited to ensure that all corresponding allocated vote accumulators can fit into CPU core cache. This can be easily implemented in most programming languages by adding a new external loop iterating through consecutive subsets of reference images. The two remaining internal loops, iterating over query image keypoints and reference image hits, may be modified to iterate only over hits with reference image identifiers from the range belonging to the current subset of reference images.

When the voting process finishes, the votes corresponding to all subsets are available in the voting accumulators, as they would be when using the approach from WO2011161084. The difference is that, due to the memory caching working in its optimal conditions, the total time needed to cast votes for all subsets is significantly shorter than the time needed for casting votes for the entire collection of reference images at once.

In some examples, the size of each set of hits is adjusted based on the size of the cache memory blocks. The optimal size of the chunk may be fixed (e.g. by setting it based on the most commonly used cache sizes) or adjusted at runtime by reading the CPU cache size programmatically.

It should be noted that, if the collection of reference images is small, all reference images will fit into one subset (i.e. the CPU will be able to fit all vote accumulators into the memory cache), and the voting order of this new approach will be identical to the naively implemented approach described in WO2011161084.

For example, in many commercial CPU's each core has access to 256 KB of L2 cache. In the proposed implementation, such L2 cache can fit approximately 2000 reference image voting accumulators. It has been experimentally confirmed that such subset size is close to optimal when tested with 100,000 reference images. On such collections the proposed voting order was executed up to 8 times faster than the naive implementation of the approach from WO2011161084. In other words, the new voting order ensures that the speed of the voting increases linearly with the number of reference images, irrespectively of the number of reference images.

It should be noted that the proposed approach may be implemented in a way where for each subset of reference images memory is explicitly allocated only for a small set of accumulators, the votes are gathered, the most promising results selected, and then the accumulators are re-initialized and the voting repeated for the next subset. Such an implementation, although not elegant, is an equivalent of the above mentioned example implementation and should result in similar speedups.

In another aspect a device configured to identify objects in a query image is disclosed. The device comprises a memory configured to store a plurality of reference images, a vocabulary of visual words and a plurality of hits, each hit corresponding to a visual word matched in a reference image, a feature extraction module configured to identify one or more keypoints in the query image corresponding to an object to be identified, a visual word module configured to assign a visual word to the one or more keypoints and a ranking module configured to rank the reference images based on the common visual words between the query image and the reference images. The ranking module is further configured to identify a set of hits corresponding to reference images comprising said one or more keypoints, rank the reference images corresponding to the identified set of hits using clustering of matches in a limited pose space, said limited pose space comprising a one-dimensional table corresponding to the rotation between the object to be identified with respect to the reference image and select a first subset of M reference images that obtained a rank above a predetermined threshold.

In some examples the device may be a mobile communication device such as a mobile phone or a tablet.

In some examples, the device may further comprise a re-ranking module configured to re-rank the M selected reference images based on spatial verification information with the normalized location of the identified object in each reference image of the first subset. The re-ranking module may further be configured to re-rank the M reference images based on the total area of the object in the M reference images.

Figure 4:
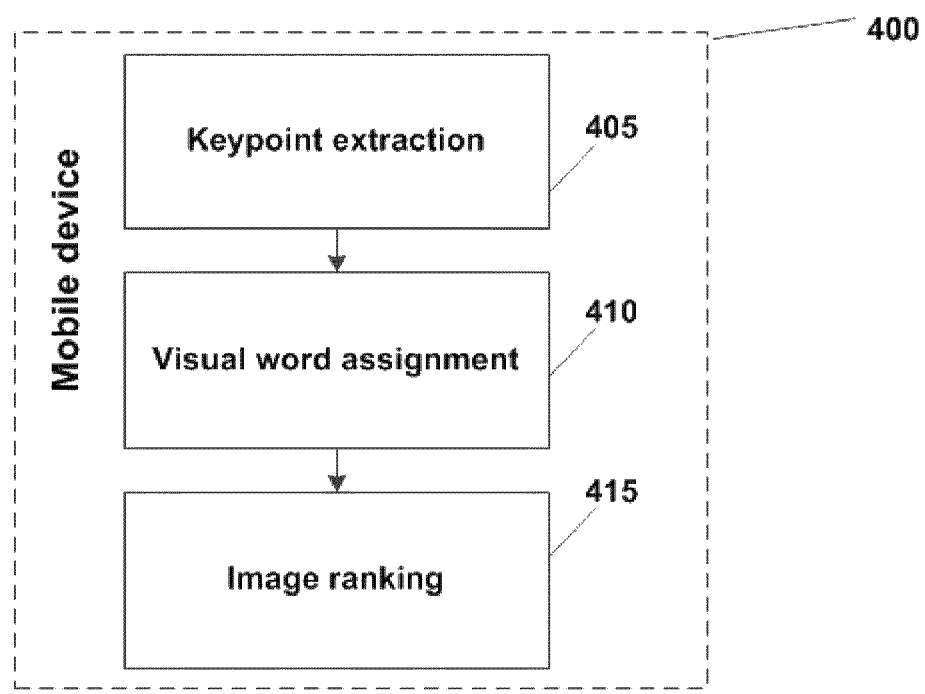
FIG. 4 illustrates a data flow diagram for an offline image recognition process according to an example.

FIG. 4 illustrates a data flow diagram for an offline image recognition process according to an example. All stages of the image recognition process are performed in mobile device 400. A first stage 405 is the keypoint extraction. Then, a second stage 410 is the assignment of visual words to the extracted keypoints. Finally a third stage 415 is the ranking of the images.

In yet another aspect, a system is disclosed. The system is configured to identify objects in a query image comprising a mobile portion and a server portion, the mobile portion configured to be remotely connected to the server portion. The mobile portion may comprise at least a feature extraction module configured to identify at least one keypoint in a query image corresponding to an object to be identified and a visual word module configured to assign a visual word to the at least one keypoint. The server portion may comprise at least a ranking module configured to rank the reference images based on the common visual words between the query image and the reference images. The ranking module may be configured to identify a set of hits corresponding to reference images comprising said at least one keypoint, rank the reference images corresponding to the identified set of hits using clustering of matches in a limited pose space, said limited pose space comprising a one-dimensional table corresponding to the rotation between the object to be identified with respect to the reference image and select a first subset of M reference images that obtained a rank above a predetermined threshold. In some implementations the mobile portion may further comprise a ranking module. The mobile portion may then be configured to rank a first set of the reference images while the server portion may be configured to rank a second set of the reference images. The first set may be a subset of the second set.

Most of the current hybrid architectures extract visual features, assign them to visual words, and represent them as histograms (the so-called Bag of Words (BoW) discussed in Ji Rongrong, Duan Ling-Yu, Chen Jie, Yao Hongxun, Rui Yong, Chang Shih-Fu, Gao Wen, "*Towards Low Bit Rate Mobile Visual Search with Multiple-channel Coding*", Proceedings of the 19th ACM International Conference on Multimedia, 2011 (Rongrong et al.).

New approaches to compression of BoW have resulted in very small fingerprints (in the range of hundreds of bytes) (see Rongrong et al.). However, most of the approaches do not use any spatial information, and therefore are not adequate for precise recognition in large collection of images (see e.g. Rongrong et al.). Other approaches use final re-ranking based on spatial consistency, but the spatial information is stored separately from the hits (that code only reference image identifiers.) (see e.g. David M. Chen, Bernd Girod, "*Memory-Efficient Image Databases for Mobile Visual Search*", IEEE Computer Society, 2014 (Chen et al.)). Only in WO2011161084 the spatial information is included into the inverted index. However, WO2011161084 does not discuss hybrid approaches.

In the proposed hybrid architecture mobile devices perform 3 stages of the recognition described in WO2011161084: (i) feature extraction, e.g. as described in Marimon et al. "*DARTs: Efficient scale-space extraction of DAISY keypoints*", 2010 IEEE Conference on Computer Vision and Pattern Recognition (CVPR), ("DART"), (ii) feature post-processing and (iii) assignment of features to visual words.

Those visual words together with spatial information such as position in the image (x,y), orientation, and scale, are then sent to the cloud search service performing the voting (as in WO2011161084) and spatial-re-ranking (spatial consistency verification, as in T. Adamek, D. Marimon, "*Large-scale visual search based on voting in reduced pose space with application to mobile search and video collections*", ICME 2011 (Adamek et al.).

The difference to the state of the art approaches is that after the visual word assignment the features are not represented as histograms like in the Bags of Words (BoW) approach, but as visual word identification combined with coarse information about their spatial information in the query image. Also, no compression of features is used. Using visual word identifiers instead of the original DART descriptors reduces the bandwidth requirements to the level slightly below the bandwidth required by sending images in JPG format. Using this architecture, allows benefiting from advantages of the approach from WO2011161084.

However, the part performed on mobile devices is very similar to the method disclosed in Chen et al. The main difference with the method of Chen et al. is that the method in Chen et al. aims to fully perform offline recognition on the device, and it does not store spatial information in the inverted index (they store and code only reference image identifiers, and the pose is stored separately (yet, not explained in what structures)). In the approach proposed herein, the pose information is stored together with image visual word identifiers.

There are various advantages over the method disclosed in WO2011161084. One is that the particular architecture specifies which components described in WO2011161084 should run on mobile and which on cloud. In the past the visual word assignments would be considered too slow to be performed on mobile devices. By performing a set of optimisations it has been shown that such architecture is feasible and performs very well in terms of adaptation to heavy recognition request traffic and scalability (large collections of images). Furthermore, the experiments revealed that rounding descriptor components of visual words to the closest integer (typically they have floating point precision) does not affect results of the system originally described in WO2011161084. This has opened the possibility of implementations of visual word assignment using integer precision performing very well on mobile devices. Moreover, using integer precision descriptors leads to much smaller dictionaries of visual words. In the proposed architecture, those dictionaries need to be present on the mobile client in order to perform visual word assignment. The size of those dictionaries is therefore contributing to the size of the client app that needs to be installed on the mobile device. Smaller dictionaries with integer precision of visual words offer significant competitive advantage.

Figure 5:
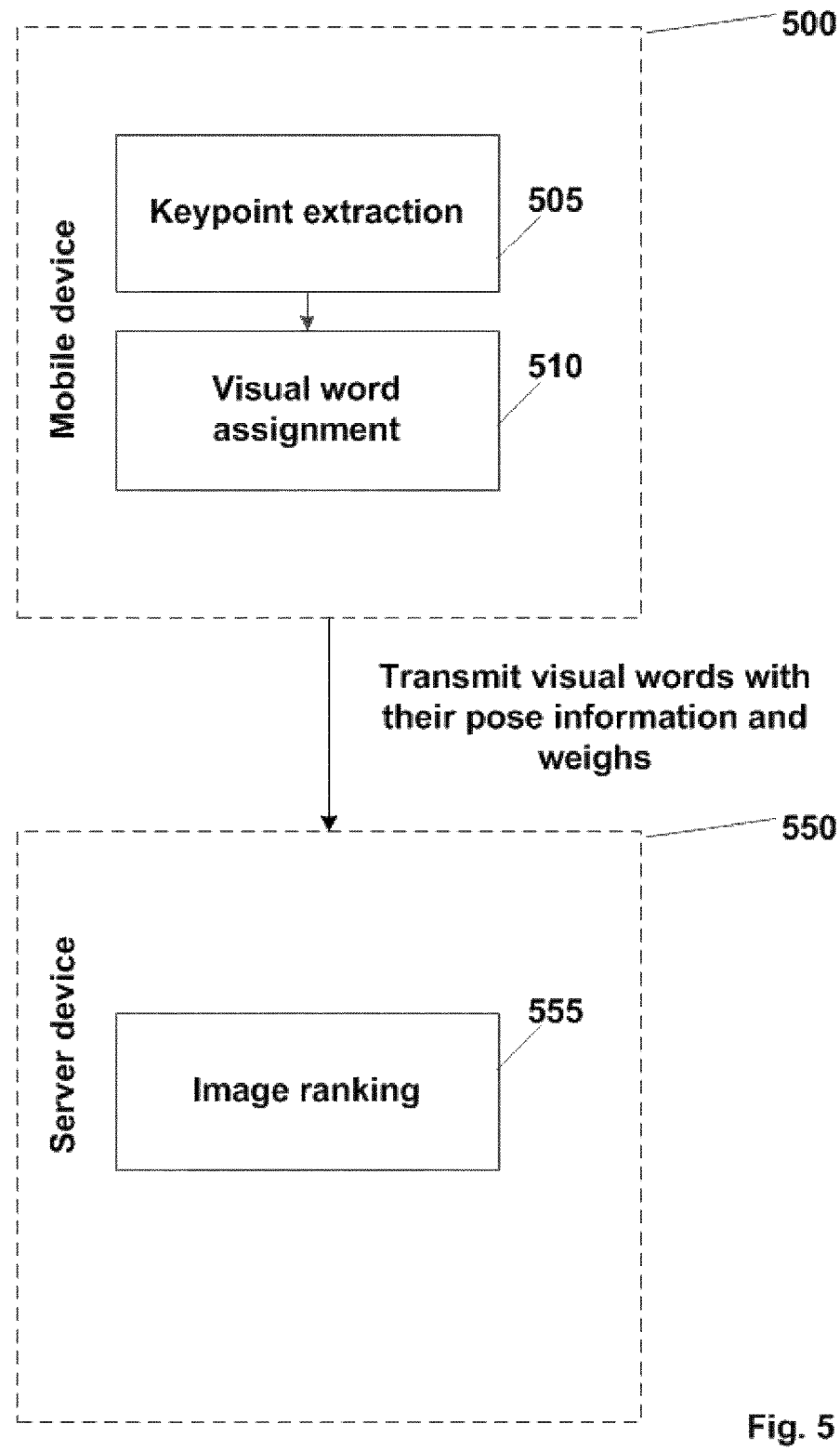
FIG. 5 illustrates a data flow diagram for a hybrid image recognition process according to an example.

FIG. 5 illustrates a data flow diagram for a hybrid image recognition process according to an example. The stages of keypoint extraction 505 and visual word assignment 510 may be performed at the mobile device. Then the visual words with their pose information and weights may be transmitted to a server device 550 (e.g. a cloud device) where the stage 555 of image ranking may be performed.

Alternatively, the architecture may comprise the subsystem deployed on mobile terminals and a central subsystem running in the cloud. The novel element is that both subsystems run all components of the recognition method. The mobile subsystem may be configured to transmit the query to the central subsystem to perform the identification of objects in the query image, in parallel to the identification performed in the mobile subsystem.

In other words, the feature extraction and search modules are deployed on both, mobile devices, and a central cloud system. Initially the subsystem running on mobile loads only a small set of reference images, e.g. the ones that are commonly matched in the particular application use case. Those most commonly recognised images can be loaded into each mobile terminal from the cloud system, based on the recognition statistics aggregated in the cloud, e.g. based on the actions of other users.

The query image captured by a mobile device may be processed by the feature extraction module. Once the features (key point visual words) are extracted they may be used for search within the collection of images loaded on the mobile terminal. If a match is found the results are already presented to the user. If no results are found, the query image features (identifiers of visual words and their related pose information), or the query image, may be sent to the cloud for performing search within the entire collection of images. When any results are found the related content may be transmitted to the mobile device, together with the indexing information allowing this particular reference image in order to be available for future searches on the mobile device.

In some implementations, even if some reference images are matched on mobile terminals, and the corresponding results are already presented to users, the mobile system may still send the query features, or the query image, to the cloud subsystem for a further search and identification of additional results. If additional results are found they (content and indexes) are transmitted to the mobile terminal.

It should be noted that both parts of the system, the mobile one, and the cloud one need to use the same dictionary of visual words. This ensures that identifiers of visual words point to the same visual word in the mobile and cloud subsystems.

Figure 6:
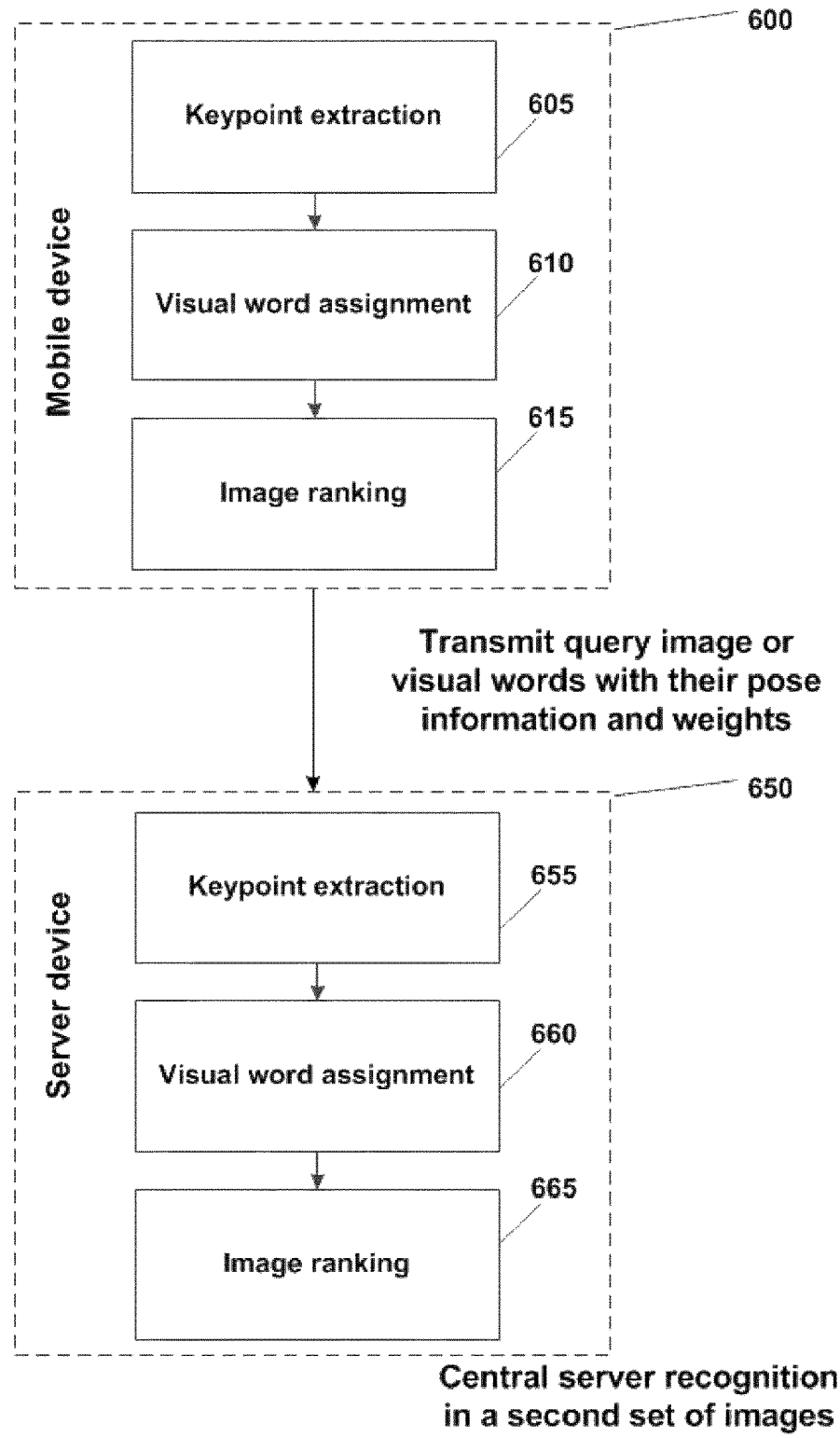
FIG. 6 illustrates a data flow diagram for an offline and hybrid image recognition process according to another example.

FIG. 6 illustrates a data flow diagram for an offline and hybrid image recognition process according to an example. All stages of the image recognition process are performed first in mobile device 600 for offline recognition in a first set of images present at the mobile device. A first stage 605 is the keypoint extraction. Then, a second stage 610 is the assignment of visual words to the extracted keypoints. Finally a third stage 615 is the ranking of the images. Then, the query image or the visual words with their pose information and weights may be transmitted to server device 650 for server side recognition in a second set of images. If the query images are sent, then, again, a first keypoint extraction stage 655 takes place, a second assignment of visual words stage 660 and a third ranking of the images stage 665. The first set of images may be independent of the second set of images. Alternatively, the first set may be a subset of the second set. If only the visual words are sent, then only stage 665, i.e. the ranking of the second set, needs to be performed on the server.

The proposed architecture has a benefit of very fast offline recognition of objects that are commonly recognised. At the same time, it avoids the need of storing all references of large collection of images on mobile devices that often suffer from limited amount of resources.

Combining offline image recognition within a small subset of images with a search in the entire collection on the cloud that uses dictionaries of visual words is also a new architecture for the method described in WO2011161084.

One of the closest architectures for mobile visual recognition was described in G. Takacs et al., "Outdoors Augmented Reality on Mobile Phone using Loxel-Based Visual Feature Organization" (Takacs et al.). There, reference image data is pushed to the mobile device based on user locations. Specifically, given the location of the mobile terminal, the corresponding database of reference images is transmitted to the mobile device for fully off line recognition. The approach constantly transmits reference image data. No recognition is performed in the cloud. In contrast, according to the method proposed herein only reference image data is transmitted based on the past recognitions performed on the mobile device or based on the importance of certain objects to the particular application use case. Also, the approach in Takacs et al. does not employ dictionaries of visual words. Instead they match feature descriptors using kd-trees. Typically this does not provide scalability that can match that of the dictionaries of visual words (i.e. the search time increases rapidly with the number of reference images that need to be checked).

Although only a number of particular embodiments and examples have been disclosed herein, it will be understood by those skilled in the art that other alternative embodiments and/or uses and obvious modifications and equivalents thereof are possible. Furthermore, the disclosure covers all possible combinations of the particular embodiments described. Thus, the scope of the disclosure should not be limited by particular embodiments.

Further, although the examples described with reference to the drawings comprise computing apparatus/systems and processes performed in computing apparatus/systems, the disclosure also extends to computer programs, particularly computer programs on or in a carrier, adapted for putting the system into practice. The program may be in the form of source code, object code, a code intermediate source and object code such as in partially compiled form, or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means. When the program is embodied in a signal that may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

The invention claimed is:

1. A method of identification of objects in a query image comprising:
   identifying at least one keypoint in the query image corresponding to an object to be identified;
   identifying a visual word in a dictionary of visual words for the at least one keypoint;
   identifying a set of hits corresponding to reference images comprising the at least one keypoint;
   ranking the reference images corresponding to the identified set of hits using vote accumulators in a limited pose space, the limited pose space comprising one-dimensional tables, each table representing a rotation between the object to be identified and the respective reference images;
   selecting a first subset of M reference images that obtained a rank above a predetermined threshold; and
   re-ranking the M selected reference images based on spatial verification information using a normalized location of the identified object in each reference image of the first subset.

2. The method according to claim 1, further comprising re-ranking the M reference images based on total matched areas of the objects in the M reference images.

3. The method according to claim 1, wherein the hits are ordered in sets so that all vote accumulators needed to store votes cast from the hits are configured to fit into one or more cache memory blocks.

4. The method according to claim 3, wherein each hit comprises a reference image identifier and the hits are ordered in a way that the reference image identifiers increase monotonically inside each visual word hit set.

5. The method according to claim 3, wherein a size of each set of hits is adjusted based on a size of the one or more cache memory blocks.

6. A device configured to identify objects in a query image comprising:
   a memory configured to store a plurality of reference images, a vocabulary of visual words and a plurality of hits, each hit corresponding to a visual word matched in a reference image,
   a feature extraction module configured to identify one or more keypoints in the query image corresponding to an object to be identified;
   a visual word module configured to assign a visual word to the one or more keypoints;
   a ranking module configured to rank the reference images based on common visual words between the query image and the reference images, the ranking module further configured to:
   identify a set of hits corresponding to reference images comprising the one or more keypoints;
   rank the reference images corresponding to the identified set of hits using vote accumulators in a limited pose space, the limited pose space comprising one-dimensional tables, each table representing a rotation between the object to be identified and the respective reference images;
   select a first subset of M reference images that obtained a rank above a predetermined threshold,
   the device further comprising a re-ranking module configured to re-rank the first subset of M reference images based on spatial verification information using a normalized location of the identified object in each reference image of the first subset of M reference images.

7. The device according to claim 6, comprising a mobile communication device.

8. The device according to claim 6, wherein the re-ranking module is further configured to re-rank the M reference images based on total matched areas area of the objects object-in the M reference images.

9. The device according to claim 6, further comprising one or more cache memory blocks, wherein the hits are ordered in sets so that all vote accumulators needed to store votes cast from the hits are configured to fit into the one or more cache memory blocks.

10. A system comprising:
    a first device according to claim 6;
    a second device according to claim 6;
    wherein the first device is configured to transmit the query image to the second device, and to perform the identification of a first set of objects in the query image in parallel with the identification of a second set of objects in the query image using the second device.

11. A system configured to identify objects in a query image comprising:
    a mobile portion and a server portion, the mobile portion configured to be remotely connected to the server portion;
    the mobile portion comprising at least:
      a feature extraction module configured to identify at least one keypoint in a query image corresponding to an object to be identified, and
      a visual word module configured to assign a visual word to the at least one keypoint; and the server portion comprising at least:
    a ranking module configured to rank reference images based on common visual words between the query image and the reference images, the ranking module configured to:
      identify a set of hits corresponding to the reference images comprising the at least one keypoint,
      rank the reference images corresponding to the identified set of hits using vote accumulators in a limited pose space, the limited pose space comprising one-dimensional tables, each table representing a rotation between the object to be identified and the respective reference images, and select a first subset of M reference images that obtained a rank above a predetermined threshold, the server portion further comprising a re-ranking module configured to re-rank the first subset of M reference images based on spatial verification information using a normalized location of the identified object in each reference image of the first subset of M reference images.

12. The system according to claim 11, wherein the mobile portion further comprises a ranking module, and wherein the mobile portion is configured to rank a first set of the reference images while the server portion is configured to rank a second set of the reference images.

13. The system according to claim 12, wherein the first set is a subset of the second set.

* * * * *